Inventor
E.J.H. DE RAEDT
A. PEETERS
By Paul W. Hemminger
Attorney

Nov. 29, 1966 E. J. H. DE RAEDT ET AL 3,288,938

LINE FINDER START CIRCUIT

Filed April 15, 1963

4 Sheets-Sheet 2

Nov. 29, 1966 E. J. H. DE RAEDT ET AL 3,288,938

LINE FINDER START CIRCUIT

Filed April 15, 1963 4 Sheets-Sheet 4

United States Patent Office 3,288,938

Patented Nov. 29, 1966

3,288,938

LINE FINDER START CIRCUIT

Egide Jacob Hendrik De Raedt and Andreas Michiel Cyriel Corneel Peeters, Antwerp, Belgium, assignors to International Standard Electric Corporation, New York, N.Y., a corporation of Delaware Filed Apr. 15, 1963, Ser. No. 273,228
Claims priority, application Netherlands, Apr. 26, 1962, 277,690
9 Claims. (Cl. 179—18.6)

The present invention relates to a telecommunication system for establishing a connection between a marked first circuit out of a first group of first circuits and a second circuit out of a second group of second circuits, via a first and a second hunting switch of at least a first and a second stage, these stages being arranged in cascade.

Such a system is well known in the art. In one known system, such as disclosed in the Dutch Patent 57,910 to J. Kruithof and L. Kozma corresponding to U.S. Patent No. 2,597,007, a free second switch, having access to a free second circuit, is connected to a free first hunting switch, having access to the marked first circuit, after which this first hunting switch is connected to the marked first circuit. In another known system of the above type a first hunting switch is seized and connected to the marked first circuit, after which a free second hunting switch is seized and connected to this seized first hunting switch. Finally, this seized second hunting switch is connected to a free second circuit. In both these known systems, the first circuits, the second circuits and the first and second hunting switches are constituted by the line circuits, the register circuits and the first and second line finders in a telephone system respectively.

A disadvantage of these known systems is that a considerable time is required for establishing a connection between a marked first circuit and a second circuit, the total average time required being equal to the sum of the average times $t_1$, $t_2$ and $t_3$ required for the connection of a marked first circuit, a first hunting switch and a second hunting switch to a first hunting switch, a second hunting switch and a register circuit respectively.

It is therefore an object of the present invention to provide a telecommunication system of the above type, wherein the speed of establishment of the said connection is increased, i.e. wherein said total average time is smaller.

The present telecommunication system is characterized by the fact, that upon a first circuit having been marked at least a free first hunting switch, having access to said marked first circuit, and at least a second hunting switch which is free and has access to a free second circuit are substantially simultaneously seized, after which said seized first hunting switch and said seized second hunting switch are connected to said marked first circuit and to said seized first hunting switch respectively.

In this manner the above average times $t_1$ and $t_2$ partially overlap each other so that the time required for the connection of a first circuit to a second hunting switch is decreased and also the above total time is made smaller.

The present telecommunication system is further characterized by the fact, that upon a first circuit having been marked a free first hunting switch, having access to said marked first circuit, and a plurality of second hunting switches, which are free and have access to a free second circuit, are substantially simultaneously seized, after which said seized first hunting switch and one of said plurality of seized second hunting switches are connected to said marked first circuit and to said seized first hunting switch respectively.

In this manner the average time $t_2$ required for the connection of a second hunting switch to a first hunting switch is decreased. By a suitable choice of the number of second hunting switches searching for a first hunting switch, the average time $t_2$ may be decreased to such a value that when added to the average time $t_3$ the thus obtained sum becomes substantially equal to the average time $t_1$. It should be noted that there is no advantage in decreasing the average time $t_1$ since in this case the sum of $t_2$ and $t_3$ would always be larger than $t_1$.

The above mentioned and other objects and features of the invention will become more apparent and the invention itself will be best understood by referring to the following description of an embodiment taken in conjunction with the accompanying drawing wherein.

Figure 1:
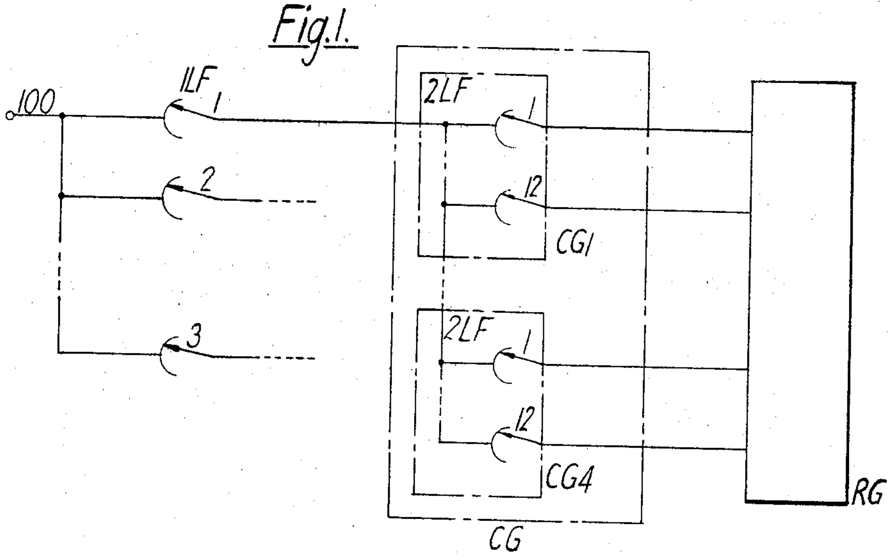
FIG. 1 is a schematic diagram showing the interconnection of groups of subscriber's lines, first line finders, second line finders and register circuits, forming part of the telecommunication system according to the present invention.
Figure 3:
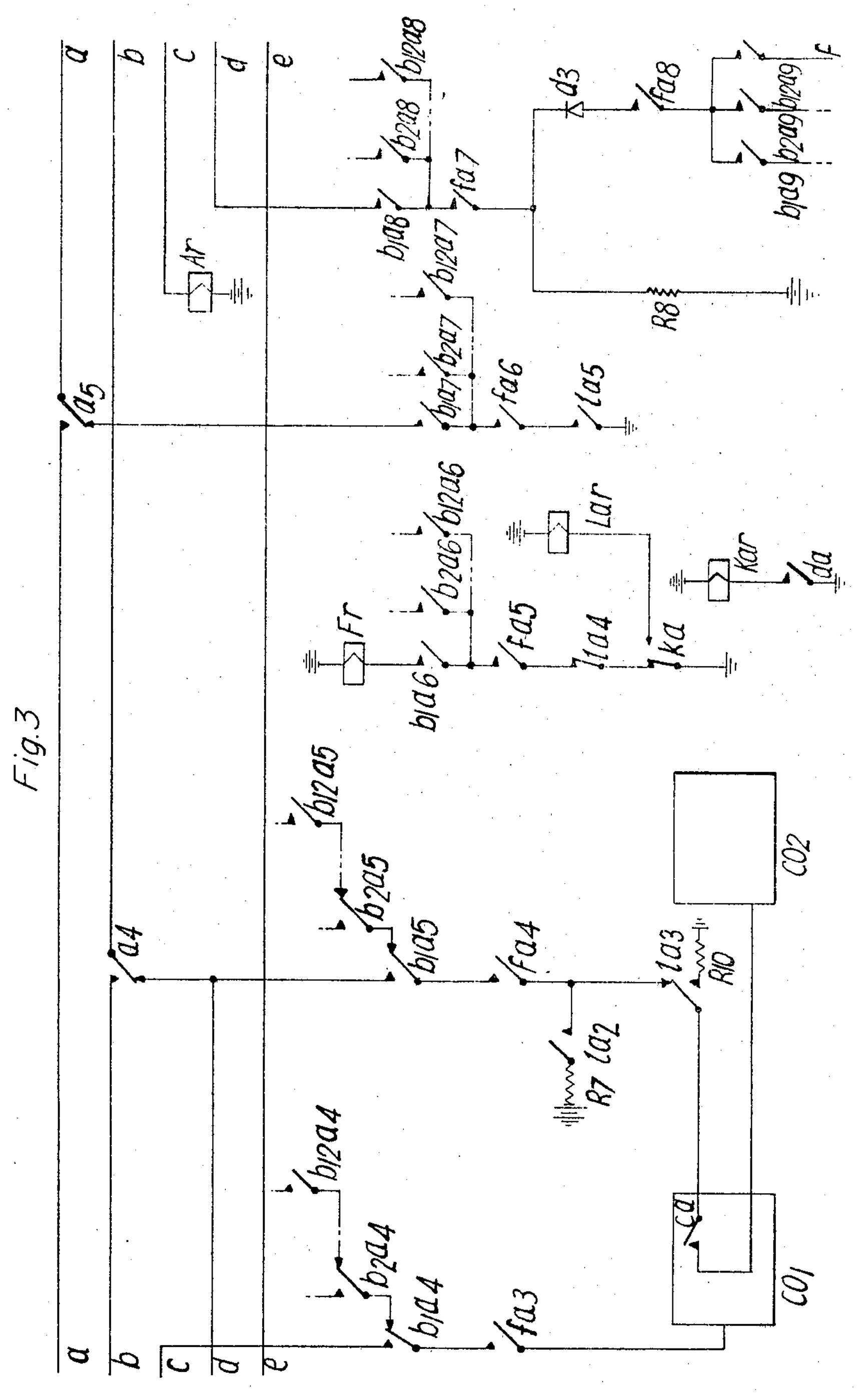
Figure 4:
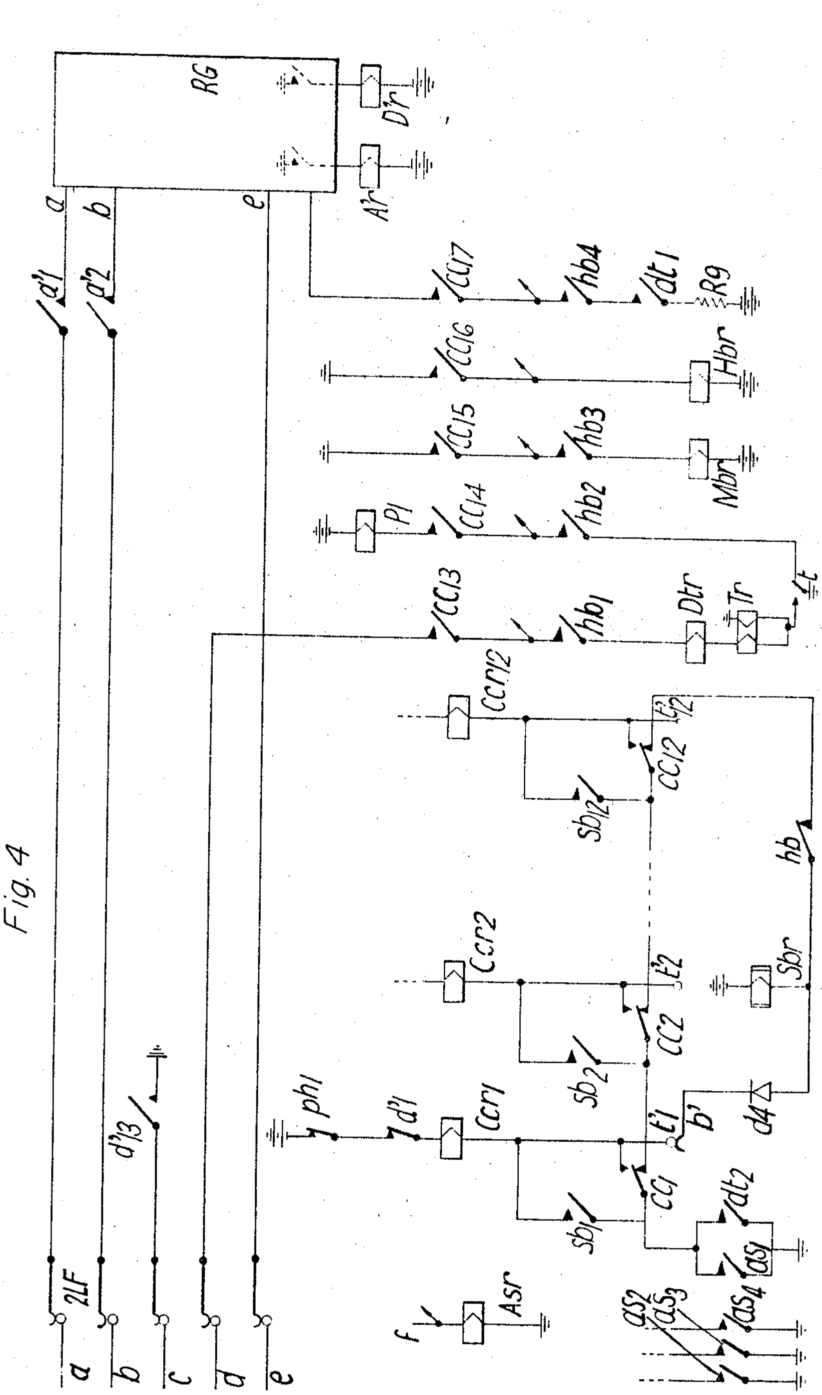
FIG. 4 shows the second control circuit associated to a group of second line finders, one of which is shown.

Principally referring to FIG. 1, the present telecommunication system includes a number of groups of 100 subscriber lines and the 100 subscriber lines of each such group are multipled in the arcs of 12 first line finders 1LF. Each of these first line finders, e.g. the first, is connected in the arcs of a number of second line finders 2LF which are distributed over four cord subgroups $CG_1$ to $CG_4$ forming a cord group CG. Each of these cord subgroups comprises 12 second line finders which are coupled to a register group RG. To the group of first line finders is associated a first control circuit and to each of the cord subgroups is associated a second control circuit. These first and second control circuits have not been shown on FIG. 1 but are represented in detail on the FIGURES 2 to 4.

Referring to these figures a subscriber line *a–b–c–d–e*, a first line finder 1LF, a second line finder 2LF and the above register group RG have also been represented thereon.

The lead *a* of this subscriber line is connected to ground via the resistance $R_1$ of 15 kilohms, the lead *b* is connected to lead *c* via the resistance $R_2$ of 15 kilohms, the lead *c* is connected to a battery of −48 volts via the resistance $R_3$ of 30 kilohms and finally the lead *d* is grounded via the resistance $R_4$. This subscriber line and also the other subscriber lines of the group of 100 subscriber lines to which the subscriber line shown belongs, are each connected via a diode $d_1$ to the common call detector circuit CD which is of the type disclosed in the Belgian Patent No. 567,179 to M. Den Hertog and S. Simon corresponding to French Patent No. 75,753 issued in 1961. This call detector includes a relay *Sar* (not shown) which is operated upon one of the above 100 subscriber lines being in the calling condition i.e. when the potential of the *c* lead of a subscriber line varies from −48 volts to −24 volts.

The first control circuit associated with the group of 12 first line finders 1LF includes a preference circuit constituted by a number of 12 relays B*ar* to $B_{12}ar$, each of which is associated with one of the 12 first line finders of the group e.g. the relay $B_1ar$ is associated with the first line finder shown.

The upper ends of the windings of the relays $B_1ar$ to $B_{12}ar$ may be connected to a battery via a change-over contact $a_1$ of a relay A*r* of the associated first line finder, and a resistance $R_5$ of 240 ohms. Only when this first line finder is free, the change-over contact $a_1$ is in the position shown.

The lower ends of the windings of the relays $B_1ar$ to $B_{12}ar$ are connected to the terminals $t_1$ to $t_{12}$ in the arc of a marker switch which comprises a brush *b″* and which is controlled by the marker electromagnet M*ar* which is of the classical type but which is only schematically represented.

It is now supposed that the subscriber line shown is brought in the calling condition. Due to this the relay S*ar* in the call detector circuit CD is operated and by the closure of the make contact *sa* of this relay, the relay H*ar* is energized.

It should be noted that the above marker switch is in an arbitrary position e.g. its brush *b''* makes contact with the terminal $t_1$ and therefore two possible cases may be considered.

In the first case, the brush *b''* of the marker switch is supposed to be connected to the lower end of the winding of a B*ar* relay ($B_1ar$ to $B_{12}ar$) associated to a first line finder which is free, i.e. the upper end of this B*ar* relay is connected to a battery via a change-over contact $a_1$ and a resistance $R_5$. It is supposed that the first line finder shown and to which is associated the relay $B_1ar$ is free. Upon the make contact $ha_1$ of the relay H*ar* being closed, the relay $B_1ar$ is then operated in the following circuit:

Ground, make contact $ha_1$, series connection of the change-over contacts $b_1a_1$ to $b_{12}a_1$ of the relays $B_1ar$ to $B_{12}ar$ respectively, break contacts $la_1$ and $fa_1$, diode $d_2$, brush *b*, terminal $t_1$, winding of relay $B_1ar$, change-over contact $a_1$, resistance $R_5$, battery.

Due to the operation of the relay $B_1ar$, the above circuit is opened by the change-over contact $b_1a_1$, but the relay $B_1ar$ is maintained energized via this change-over contact $b_1a_1$ and the make contact $ha_1$. It should be noted that due to the operation of relay H*ar* a ground is also connected to the lower end of the winding of the slowly operating relay E*ar* via the contacts $ha_1$, $b_1a_1$ to $b_1a_{12}$, $la_1$ and $fa_1$. This relay E*ar* will however not be operated since the contact $b_1a_1$ is opened upon the relay $B_1ar$ being energized.

In the second case, the brush *b''* of the marker switch is supposed to be connected to the lower end of the winding of a B*ar* relay associated with a first line finder which is not free, i.e. the upper end of the winding of this B*ar* relay is not connected to a battery due to the change-over contact $a_1$ being in its work position. It is supposed that the brush *b''* of the marker switch is positioned on the terminal $t_2$ and that the first line finder to which the relay $B_2ar$ is associated is not free.

Upon the make contact $ha_1$ of the relay H*ar* being closed, the relay $B_2ar$ cannot be operated. This time, the relay E*ar* will be energized in the circuit given above and due to the closure of the contacts $ea_1$ to $ea_{12}$ of this relay, the lower end of the winding of each of the relays $B_1ar$ to $B_{12}ar$ is connected to ground via one of the contacts $ea_1$ to $ea_{12}$, the series connection of the contacts $b_1a_1$ to $b_1a_{12}$ of the preceding B*ar* relays and the make contact $ha_1$. Hence all these relays, $B_2ar$ excepted, may be energized when the first line finder to which they are associated is free. However since an operated B*ar* relay opens the operating circuits of all the following relays, only the B*ar* relay of the first free line finder will be operated. In the present example the relay $B_1ar$ is energized when the first line finder shown is free.

From the above, it follows that in both the above cases considered a relay, such as $B_1ar$ of the free first line finder shown, is energized. In other words the first line finder shown is seized. By the closure of the make contact $b_1a_2$ the relay F*ar* is energized.

By the opening of the break contact $fa_1$ of this relay, the above preference circuit shown is prevented from being operated again.

Upon the closure of the make contact $fa_2$ the marker electromagnet M*ar* of the marker switch is energized via the make contacts $b_1a_3$ and $fa_2$.

Upon the closure of the make contact $fa_3$ the potential comparator $CO_1$ is connected to the *c* brush of the free first line finder shown in the following way:

*c* brush, change-over contact $b_1a_4$, make contact $fa_3$, input of the potential comparator $CO_1$.

This potential comparator is of the type disclosed in the Belgian Patent No. 607,583 (A. Peeters-S. Simon-E. De Raedt), and has therefore not been shown in detail. As explained in this patent the comparator $CO_1$ serves for detecting the subscriber line which is in the calling condition.

Upon the closure of the make contact $fa_5$ the control electromagnetic F*r* of the seized free first line finder shown is operated in the following circuit:

Ground, change-over contact *ka*, break contact $la_4$, make contacts $fa_5$ and $b_1a_6$, winding of the control electromagnet F*r*, battery.

In this manner the seized free first line finder shown hunts for the calling subscriber line.

When this calling line is found the relay C*ar* (not shown) included in the potential comparator $CO_1$ is energized. By the closure of the make contact *ca* of this relay, the potential comparator $CO_2$ is then connected to the *d* brush of the seized free first line finder shown in the following manner:

*d* brush, change-over contact $b_1a_5$, make contact $fa_4$, change-over contact $la_3$, make contact *ca*, input of the potential comparator $CO_2$.

This potential comparator is also disclosed in the last mentioned Belgian Patent No. 607,583 and has therefore also not been shown in detail. This potential comparator $CO_2$ serves for detecting if the subscriber line which has been brought in the calling condition is still free i.e. if it has not been seized by a final selector.

When the calling line is still free a relay D*ar* (not shown) included in this potential comparator $CO_2$ is operated. By the closure of the make contact *da* of this relay D*ar*, the relay K*ar* is energized so that the operating circuit of the control electromagnet F*r* is opened by the change-over contact *ka*. Consequently the seized free first line finder shown is stopped on the calling line. Simultaneously the relay L*ar* is operated.

Figure 2:
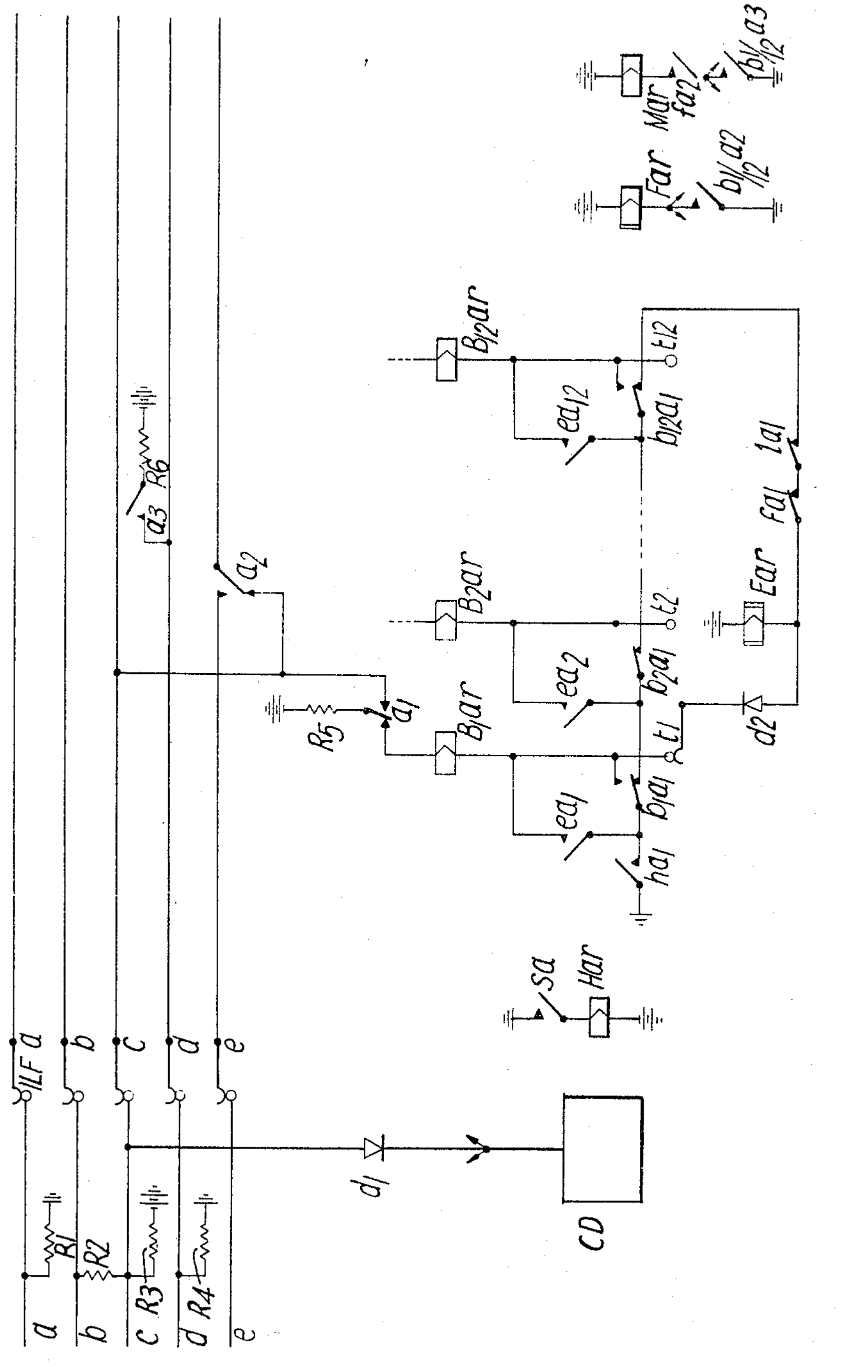
FIGS. 2 and 3 represent the first control circuit associated to a group of first line finders, one of which is shown.

The break contact $la_1$ of FIG. 2 is opened, thus preventing the above preference circuit to be operated.

The calling line is rendered busy by connecting a battery to its *d* lead in the following manner:

Battery, resistance $R_7$ of 5,700 ohms, make contacts $la_2$ and $fa_4$, change-over contact $b_1a_5$, *d* brush of the seized free first line finder shown, *d* lead.

A ground is connected to the comparator $CO_2$ via the resistance $R_{10}$ of 5,100 dms., the change-over contact $la_3$ and make contact *ca* in order to maintain busy this comparator.

A ground is also connected to the "*a*" wire of the seized free first line finder shown via make contacts $la_5$, $fa_6$, $b_1a_7$ and the change-over contact $a_5$. Since this *a* wire is connected in the arcs of the second line finders included in the cord subgroups $CG_1$ to $CG_4$, the first line finder seized is marked in these arcs.

A battery is further connected to the *d* wire of the seized free first line finder shown via resistance $R_8$ and make contacts $fa_7$ and $b_1a_8$. Since this *d* wire is also connected in the arcs of the second line finders included in the above cord subgroups $CG_1$ to $CG_4$ the first line finder seized, is marked in these arcs.

The last mentioned battery is also connected to the relay A*sr* (FIG. 4) which is associated to these 4 cord subgroups via resistance $R_8$, diode $d_3$, make contacts $fa_8$ and $b_1a_9$, lead *f*, winding of relay A*sr*, ground.

By the closure of the make contacts $as_1$ to $as_4$ of the relay A*sr* the second control circuits associated to the above cord subgroups $CG_1$ to $CG_4$ are operated. Only the second control circuit associated to the cord subgroup $CG_1$ of which the second line finder shown forms part will be described in detail, reference being made to FIG. 4.

The second control circuit includes a preferred circuit which is of the type described above and which is constituted by 12 relays $CCR_1$ to $CCR_{12}$ each of which is associated with a second line finder of the subgroup $CG_1$ considered. This second control circuit further includes a marker switch having terminals $t'_1$ to $t'_{12}$ and a brush $b'$. This marker switch is controlled by the marker electromagnet M*br*, identical to M*ar*.

This preference circuit operates in the same manner as the preference circuit included in the first control circuit and will therefore not be described in detail. However, it should be noted that a C*cr* relay ($Ccr_1$ to $Ccr_{12}$) can only be operated when it is associated to a second line finder which is simultaneously free and has access to a free register circuit e.g. the relay $Ccr_1$ can only be operated when the break contact $d'_1$ of the relay D'*r* is closed, i.e. when the associated second line finder is free and when simultaneously the break contact $ph_1$ is closed, i.e. when the associated second line finder has access to a free register circuit.

It is supposed that the relay $Ccr_1$ associated to the second line finder shown has been operated. In other words, the second line finder shown has been seized. By the closure of the make contact $cc_{16}$ of this relay, the relay H*br* is energized.

Due to the opening of the break contact *hb*, the preference circuit is prevented from being operated again.

The marker electromagnet M*br* is operated via the make contacts $hb_3$ and $cc_{15}$, whereas the control electromagnet $P_1$ of the seized free second line finder shown is energized as follows:

Ground, change-over contact *t*, make contacts $hb_2$ and $cc_{14}$, winding of electromagnet $P_1$, battery.

In this manner the seized second line finder shown hunts for the marked first line finder.

Further, the test relays D*tr* and T*r*, the aim of which is well known, are connected to the *d* brush of the seized second line finder shown in the following way:

Ground, windings of relays T*r* and D*tr*, make contact $hb_1$ and $cc_{13}$, *d* brush.

It should be noted that also in each of the cord subgroups $CG_2$ to $CG_4$, a second line finder, which is free and has access to a free register circuit, has been seized. These second line finders also hunt for the marked first line finder and they also have their *d* brush connected to the test relays T*r* and D*tr* included in the associated second control circuit. One of the four hunting second line finders arrives first on the marked first line finder. It is supposed that this is the case for the second line finder shown. When this happens the relay T*r* is operated, since the *d* wire of the marked first line finder is connected to a battery via the make contacts $b_1a_8$, $fa_7$ and the resistance $R_8$ in FIG. 3.

Due to the position of the change-over contact *t* of the relay T*r* being then modified, the right hand or high impedance winding of this relay is short-circuited, so that the test relay D*tr* is energized. Simultaneously the operating circuit of the electromagnet $P_1$ is opened so that the seized second line finder shown is stopped and hence connected to the marked first line finder.

Upon the high impedance winding of the relay T*r* having been short-circuited and due to the sum value of the resistances of the winding of relay D*tr* and the left hand winding of relay T*r* being much smaller than the value of the resistance $R_8$, the upper end of the resistance $R_8$ is practically grounded. Consequently the relay A*sr* is released. In this manner the operating circuits of the C*cr* relays in each of the second control circuits are opened in $as_{1-4}$. Consequently these second control circuits will be released, except the second control circuit shown due to the make contact $as_1$ being branched in parallel with the closed make contact $dt_2$ of the operated relay D*tr*.

By the closure of the make contact $dt_1$ of the relay D*tr* the seized free second line finder shown is marked in the register group RG by the connection to this register group of a battery via the resistance $R_9$ and the make contacts $dt_1$, $hb_4$ and $cc_{17}$. One of the free register circuits of this register group is then seized and it operates the relay A'*r* in the second control circuit shown. The free register circuit seized is connected on the one hand to the *a* and *b* brushes of the seized second line finder shown, by the closure of the make contacts $a'_1$ and $a'_2$ of this relay, and on the other hand to the *c* lead of the calling subscriber line in the following manner:

*c* lead of the calling subscriber line, *c* brush of the seized first line finder shown, change-over contact $a_2$, lead *e*, brush *e* of the seized second line finder, register circuit RG. A check is made on this *c* lead for detecting an eventually restrictive service.

Afterwards the seized register circuit operates the relay D'*r* in the second control circuit. Due to this the brush *c* of the seized second line finder shown is grounded via the make contact $d'_{13}$ so that the relay A*r* of FIG. 3 in the first control circuit is energized.

The operated relay D'*r* initiates the release of the second control circuit associated to the seized second line finder shown, whereas the relay A'*r* initiates the release of the first control circuit associated to the seized second first line finder shown.

Indeed the opening of the break contact $d'_1$ releases the relay $Ccr_1$ followed by the other relays of this first control circuit whereas the displacement of the change-over contact $a_1$ to its work position releases the relay $B_1ar$ followed by the other relays of this first control circuit. For instance, the control electromagnets M*ar* and M*br* of the marker switches will be released so that these marker switches will make one step. Thus it is ensured that when another call is made another first and second line finder will be seized for establishing a connection between the calling line and a free register circuit.

Upon the change-over contacts $a_1$ modifying its position, a battery is connected to the *c* brush of the seized first line finder shown via the resistance $R_5$. In this manner this first line finder is made busy. This battery is also connected to the *c* lead of the calling subscriber line via the *c* brush of the first line finder shown. Due to this call detector CD is released.

Upon the change-over contacts $a_5$, $a_4$ and $a_2$ changing their position the seized register circuit is connected to the *a*, *b* and *e* leads of the calling subscriber line via the seized second and first line finders shown.

Also a battery is connected to the *d* lead of the calling subscriber line via the resistance $R_6$, the make contact $a_3$ and the *d* brush of the seized first line finder. In this manner the calling line will remain busy although the make contactor $la_2$ will be opened upon the first control circuit being released.

While the principles of the invention have been described above in connection with specific apparatus, it is to be clearly understood that this description is made only by way of example and not as a limitation on the scope of the invention.

We claim:

1. A telecommunication system for establishing a connection between a first circuit out of a first group of first circuits and a second circuit out of a second group of second circuits, said system comprising a first and a second hunting switch of at least a first and a second stage, said stages being arranged in cascade, a first circuit for receiving a marking signal, said first hunting switch having access to said first circuit, a second circuit, said second hunting switch having access to said second circuit, means responsive to a mark on said first circuit for seizing said first and second hunting switches substantially simultaneously, said first hunting switch and said second hunting switch responding to said seizure to be connected to said marked first circuit and to said seized first hunting switch respectively.

2. A telecommunication system substantially as claimed in claim 1, in which upon a first circuit having been marked a free first hunting switch, having access to said marked first circuit, and a plurality of second hunting switches, which are free and have access to a free second circuit, are substantially simultaneously seized, after which said seized first hunting switch and one of said plurality of seized second hunting switches are connected to said marked first circuit and to said seized first hunting switch respectively.

3. A telecommunication system substantially as claimed in claim 1, in which the first circuit, the second circuit, the first hunting switch and the second hunting switch are constituted respectively by a line circuit, a register circuit, a first line finder, and a second line finder whereby a line circuit having been brought in the calling condition a first line finder which is free and has access to the calling line, and a plurality of second line finders which are free and have access to a free register circuit, are substantially simultaneously seized, after which said seized first line finder and one of said plurality of seized second line finders are connected to said calling line and to said seized first line finder respectively, and finally a free register circuit is then connected to the one seized second line finder which has been connected to the seized first line finder.

4. A telecommunication system substantially as claimed in claim 1, in which a detector circuit, a first control circuit and a second control circuit are associated respectively with said first group of first circuits with each said first stage and with each said second stage respectively, and upon one of the first circuits of said first group being marked said detector circuit is operated due to which said first control circuit is operated for controlling the seizure of a free first hunting switch which is then marked and for controlling the connection of the marked first hunting switch to said marked first circuit, and upon a first hunting switch having been marked said second control circuit is operated for controlling the seizure of a second hunting switch, which is free and has access to a free second circuit, and for controlling the connection of the seized second hunting switch to the marked first hunting switch.

5. A telecommunication system substantially as claimed in claim 4, in which said first control circuit includes a first preference circuit for seizing a different first hunting switch in said first stage each time another first circuit of said first group is marked, said first preference circuit is constituted by a number of first relays each of which is associated with a first hunting switch of said first stage, and a first marker switch, and one end of the winding of each of said first relays is coupled to one pole of a first D.C. source via a first break contact which is closed when the associated first hunting switch is free, whereas the other end of said winding may be coupled to the other pole of said first D.C. source via said first marker switch which is stepped to its next position each time another first circuit of said first group is marked.

6. A telecommunication system substantially as claimed in claim 5, in which the second control circuit includes a second preference circuit for seizing a different second hunting switch in said second stage each time another first hunting switch of said first stage is marked, said second preference circuit including a number of second relays having windings associated with a second hunting switch of said second stage, a second marker switch connected between one end of the winding of each of said second relays and one pole of a second D.C. source via the series connection of second and third break contacts which are closed when the associated second hunting switch is free and has access to a free second circuit, and the other end of said winding may be coupled to the other pole of said second D.C. source via said second marker switch which is stepped to its next position each time another first hunting switch of said first stage is marked.

7. A telecommunication system substantially as claimed in claim 6, in which said first marker switch is a rotary switch to each of the terminals of which the other end of a first relay is connected, the brush of said first marker switch is coupled on the one hand to a first slowly operating relay and on the other hand to said other pole of said first D.C. source via the series connection of closed fourth break contacts of said first relays and of a first make contact of a third relay and said other end of each of said first relays is coupled to said other pole via the parallel connection of an own second make contact and a third make contact of said first slowly operating relay, said parallel connection being connected in series with the fourth break contacts of the preceding first relays and said first make contact.

8. A telecommunication system as claimed in claim 7, in which said second marker switch is a rotary switch to each of the terminals of which the other end of a second relay is connected, whereas the brush of said second marker switch is coupled on the one hand to a second slowly operating relay and on the other hand to said other pole of said second D.C. source via the series connection of closed fifth break contacts of said second relays and of a fourth make contact of a fourth relay and said other end of each of said second relays is coupled to said other pole via the parallel connection of an own fifth make contact and a sixth make contact of said second slowly operating relay, said parallel connection being connected in series with the fifth break contacts of the preceding second relays and said fourth make contact.

9. A telecommunication system as claimed in claim 8, in which said first control circuit includes a fifth relay, when a first circuit is marked said detector circuit is operated to energize said third relay so that one of said first relays is energized, said operated first relay energizes said fifth relay which marks and operates the first hunting switch to which the operated first relay is associated, said fifth relay also energizes said fourth relay so that one of said second relays is operated, and that said operated second relay marks and operates the second hunting switch to which the operated second relay is associated.

References Cited by the Examiner

UNITED STATES PATENTS

| | | | |
|---|---|---|---|
| 2,691,067 | 10/1954 | Buchner | 179—18.6 |
| 2,774,819 | 12/1956 | Lomax | 179—18.6 |

FOREIGN PATENTS

| | | |
|---|---|---|
| 886,279 | 1/1962 | Great Britain. |
| 70,695 | 9/1952 | Netherlands. |

KATHLEEN H. CLAFFY, *Primary Examiner.*

L. A. WRIGHT, *Assistant Examiner.*